United States Patent
Yang et al.

(10) Patent No.: US 6,462,521 B1
(45) Date of Patent: Oct. 8, 2002

(54) HIGH-SPEED CHARGE-MODE CONTROLLER FOR A MULTI-PHASE SWITCHED-MODE POWER CONVERTER

(75) Inventors: Eric X. Yang, Saratoga; Trevor M. Newlin, San Jose, both of CA (US)

(73) Assignee: Semtech Corporation, Newbury, CA (US)

( * ) Notice: Subject to any disclaimer, the term of this patent is extended or adjusted under 35 U.S.C. 154(b) by 0 days.

(21) Appl. No.: 09/908,007

(22) Filed: Jul. 17, 2001

(51) Int. Cl.[7] ................................................ G05F 1/40
(52) U.S. Cl. ........................................ 323/272; 323/282
(58) Field of Search ............................... 363/65, 25, 26, 363/71; 323/282, 284, 272, 266, 267, 312, 315, 222, 224, 288; 318/46, 53; 375/371, 376

(56) References Cited

U.S. PATENT DOCUMENTS

| | | | | | |
|---|---|---|---|---|---|
| 4,821,297 A | * | 4/1989 | Bergmann et al. | ........... | 375/120 |
| 5,278,489 A | * | 1/1994 | Bowers | ....................... | 323/225 |
| 5,477,132 A | * | 12/1995 | Canter et al. | ................ | 323/282 |
| 5,712,540 A | * | 1/1998 | Toda et al. | .................... | 318/46 |
| 5,831,837 A | * | 11/1998 | Coyne et al. | ................. | 363/97 |
| 6,137,274 A | * | 10/2000 | Rajagopalan | ................ | 323/272 |
| 6,198,261 B1 | * | 3/2001 | Schultz | ........................ | 323/272 |
| 6,215,290 B1 | * | 4/2001 | Yang et al. | .................. | 323/282 |
| 6,278,263 B1 | * | 10/2001 | Walters et al. | .............. | 323/272 |
| 6,362,608 B1 | * | 3/2002 | Ashburn et al. | ............. | 323/272 |

* cited by examiner

Primary Examiner—Rajnikant B. Patel
(74) Attorney, Agent, or Firm—Thelen Reid & Priest LLP; David B. Ritchie (57) ABSTRACT

A multiphase controller for a PWM power converter employs a single current sense device to measure input current, I, and an integrator at each phase to accurately measure power delivered during a pulse. The integrator monitors current delivered through a circuit which delivers a current signal scaled to I/N where N is the number of active phases. Thus where there are three overlapping phases, one-third of I is delivered to the integrator for each phase that is on or active. The integrator provides a Charge Ramp signal to an input of a Pulse Width Modulation (PWM) comparator associated with each phase. The other input of the PWM comparator is tied to an error control signal common to all of the phases. When the Charge Ramp signal and the error control signal match, the corresponding phase is turned off for the duration of the cycle.

32 Claims, 12 Drawing Sheets

HIGH-SPEED CHARGE-MODE CONTROLLER FOR A MULTI-PHASE SWITCHED-MODE POWER CONVERTER

FIELD OF THE INVENTION

The present invention is directed to a high-speed charge-mode controller for use with a switched-mode power converter.

BACKGROUND OF THE INVENTION

Power converters are used in modem electronic equipment to convert relatively poorly regulated direct current (DC) power supply voltages to highly regulated DC power supply voltages. Such devices are used, for example, to power microprocessors and similar devices. Current technology microprocessors can require 1.5 volts or less of supply voltage at peak levels exceeding 80 amperes (A). Because such devices are often switched at rates exceeding 1.5 GHz, they routinely experience current slew rates of 400 A/microsecond ($\mu$Sec) or more. As a result, it has become necessary in recent years to provide such devices with power from a multi-phase voltage regulator. The multi-phase voltage regulator typically obtains its power from a single relatively poorly regulated power supply and provides a number of sources (phases) of highly regulated voltage for use by the device.

In the past, peak input current mode (PICM) control has been used to control some multi-phase controllers, such as the Semtech SC-2422, SC-2425, SC-2424, SC-2433 and SC-2434 models available from Semtech Corporation of Newbury Park, California. In such PICM systems, current sensing is realized on the input positive rail of the power converter by using a low value (e.g., 0.002–0.005 Ohm) current sensing resistor. The PICM-type approach generally works well and has the advantages that: (1) phase currents are automatically balanced; (2) active voltage positioning is easily implemented with very good precision; (3) the wide control bandwidth settles the output to its correct position very quickly; and (4) module current sharing can be implemented.

Although PICM has these merits, it also has some shortcomings. These are: (1) the leading edge spike of the MOSFET (metal oxide semiconductor field effect transistor) current needs to be filtered out; (2) parasitics in the layout tend to interact with the sensing filter to cause ringing and limit operational frequencies to about 500 KHz per phase at 5 volts input and 250 KHz per phase at 12 volts input; (3) in order to avoid overlapping of the current pulses coming from different phases (a requirement of this approach) multiple sensing resistors and current amplifiers are required. This last shortcoming adds to system cost and IC (integrated circuit) pin count. The maximum duty cycle of the PWM (pulse with modulation) pulses is also limited depending on the configuration to less than 50% for a two-phase controller, less than 33% for a three-phase controller, etc. This limits the applications in which such a controller may be used.

Accordingly, it would be desirable to provide a high-speed controller which could operate on multiple phases with no duty cycle overlap limitation and no requirement for multiple current sensing devices.

BRIEF DESCRIPTION OF THE INVENTION

A multiphase controller for a PWM power converter employs a single current sense device to measure input current, I, and an integrator at each phase to accurately measure power delivered during a pulse. The integrator monitors current delivered through a circuit which delivers a current signal scaled to I/N where N is the number of active phases. Thus where there are three overlapping phases, one-third of I is delivered to the integrator for each phase that is on or active. The integrator provides a Charge Ramp signal to an input of a Pulse Width Modulation (PWM) comparator associated with each phase. The other input of the PWM comparator is tied to an error control signal common to all of the phases. When the Charge Ramp signal and the error control signal match, the corresponding phase is turned off for the duration of the cycle.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a high-speed charge-mode controller for a multi-phase switched mode power converter. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1A:
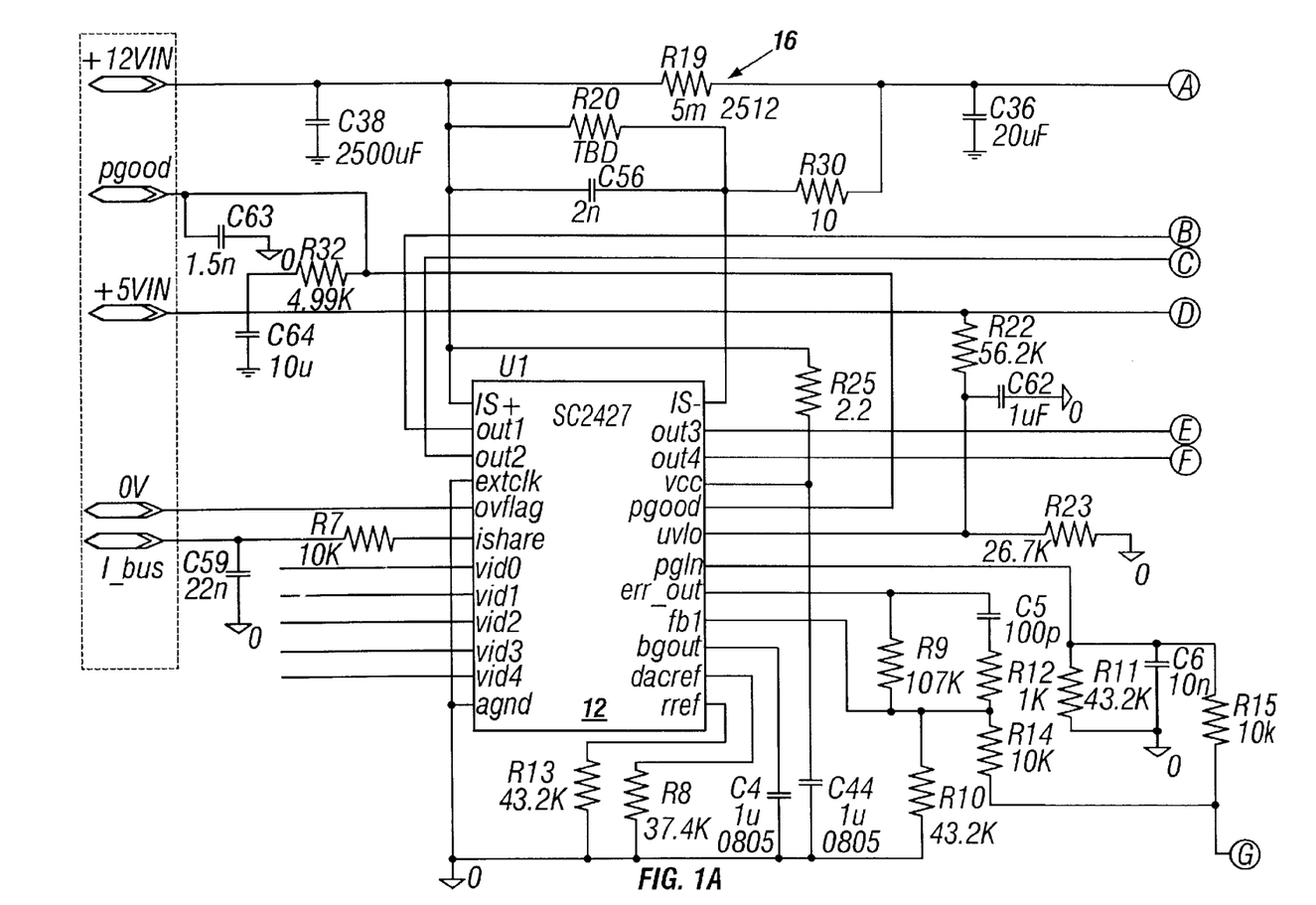
FIG. 1 is an electrical schematic diagram of a typical application circuit employing a high-speed charge-mode, multi-phase power converter in accordance with an embodiment of the present invention.
Figure 1B:
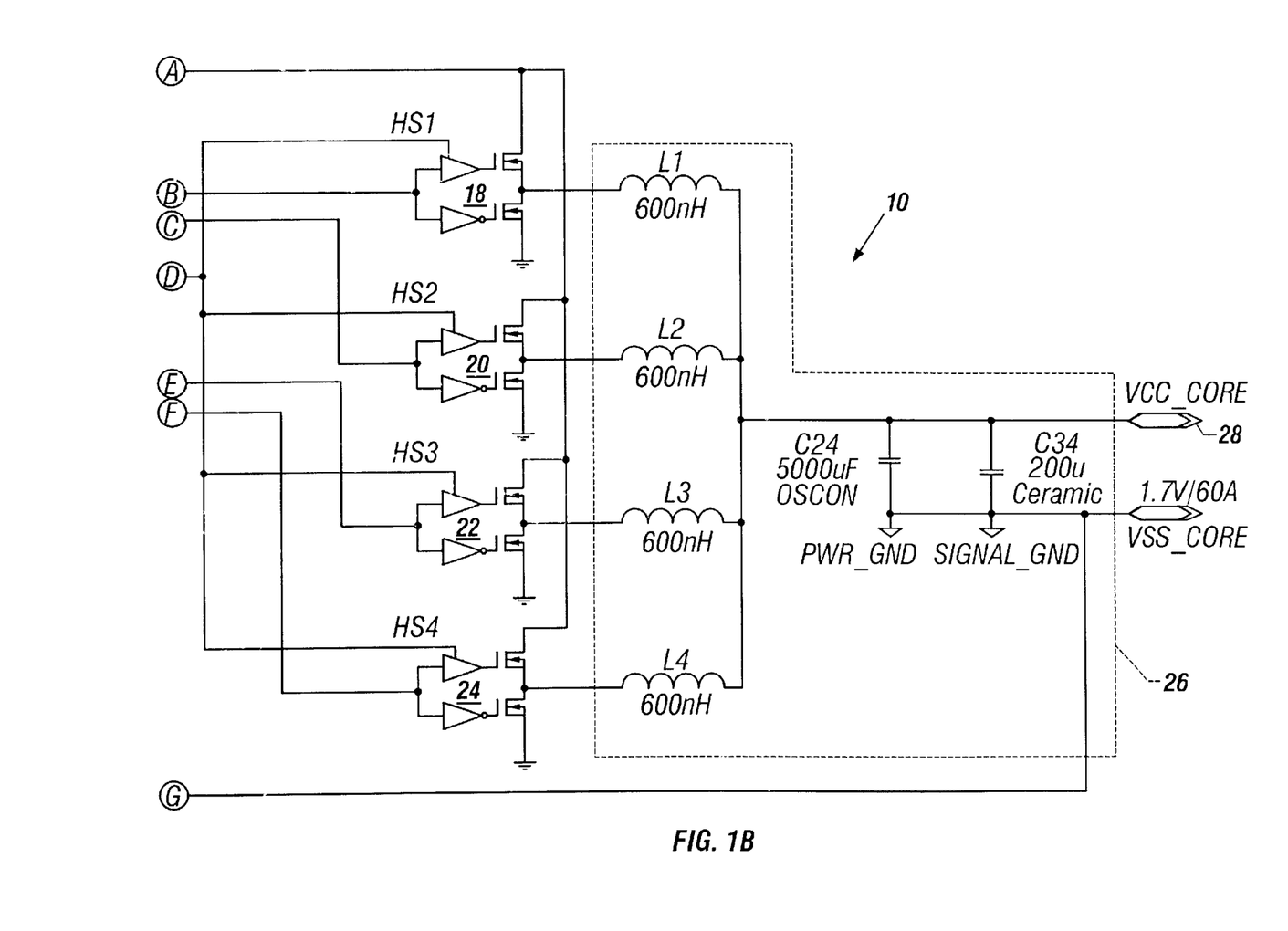

Turning now to the figures, FIG. 1 is an electrical schematic diagram of a typical application circuit 10 employing a high-speed charge mode controller 12 for a multi-phase switched mode power converter. The example circuit 10 includes a number of inputs 14, a current sense resistor R19 (16), driver circuits H51, H52, H53 and H54 for the four phases shown, and pulse width modulation (PWM) MOSFET pairs 18, 20, 22 and 24 corresponding to each driver circuit. Example circuit 10 also includes conventional filter circuitry 26 and provides a highly regulated output voltage at pin 28.

Figure 2:
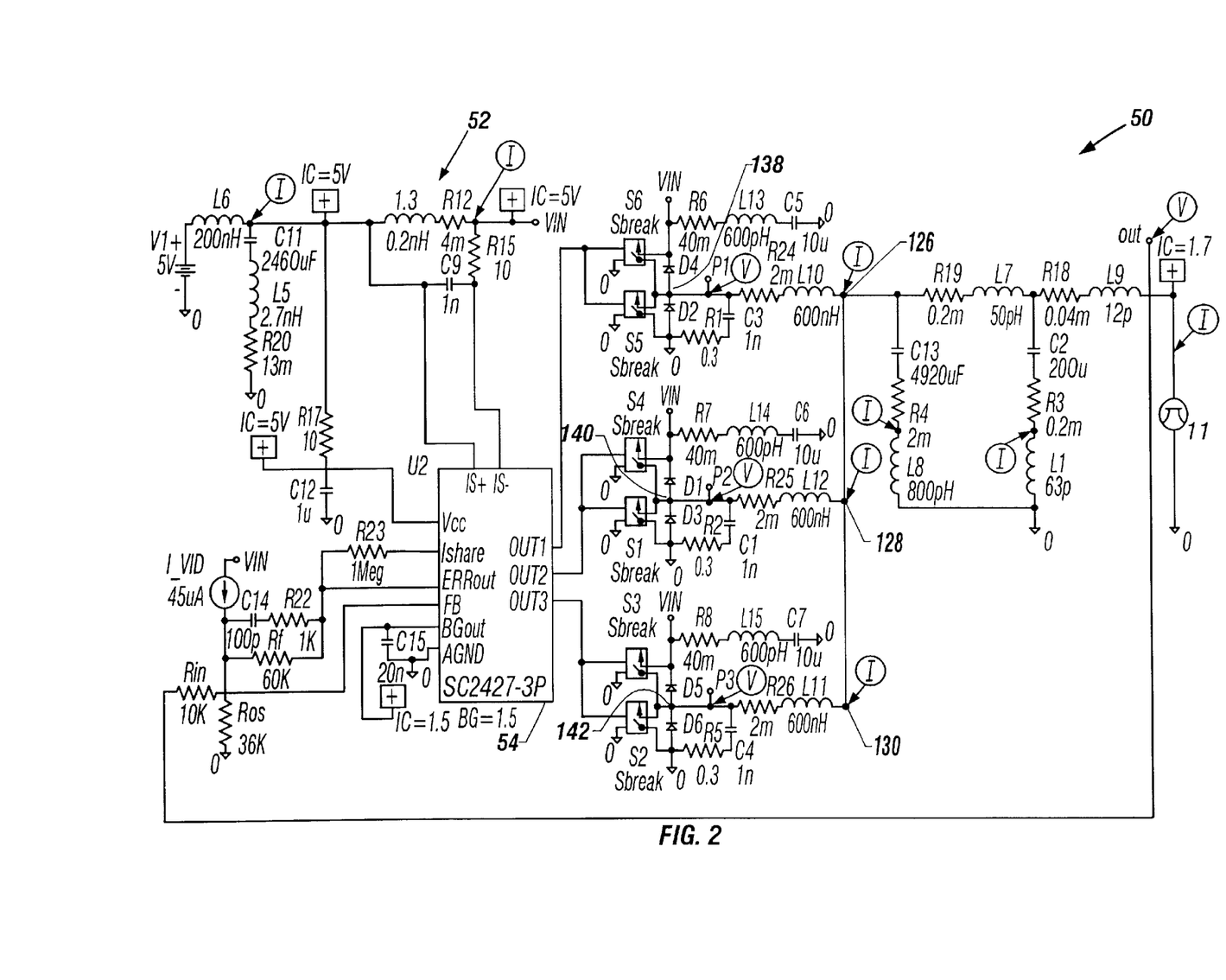
FIG. 2 is a simulation circuit illustrating the operation of an IICM (integrated input current mode) power converter circuit. This circuit is implemented as a 250 KHz three-phase five-volt input 1.6±80 mv output 45A buck-type voltage converter.

FIG. 2 is a simulation circuit 50 illustrating the operation of an IICM (integrated input current mode) power converter circuit in accordance with one embodiment of the present invention. This circuit is implemented as a 250 KHz three-phase five-volt input 1.6±80 mV output 45A buck-type voltage converter. Total input current is sensed at R12 (52) and delivered to controller 54 via pins designated IS+ and IS−. In one embodiment, R12 has a resistance in a range of about 0.002 ohms to about 0.005 ohms. Alternatively a current transformer or other known approach may be used to sense current. Controller 54 may be a single integrated circuit but is not required to be. Controller 54 may provide output pins for each desired phase or may have extra unused output pins. Voltage reference is provided by a highly precise conventional band gap source.

Figure 3:
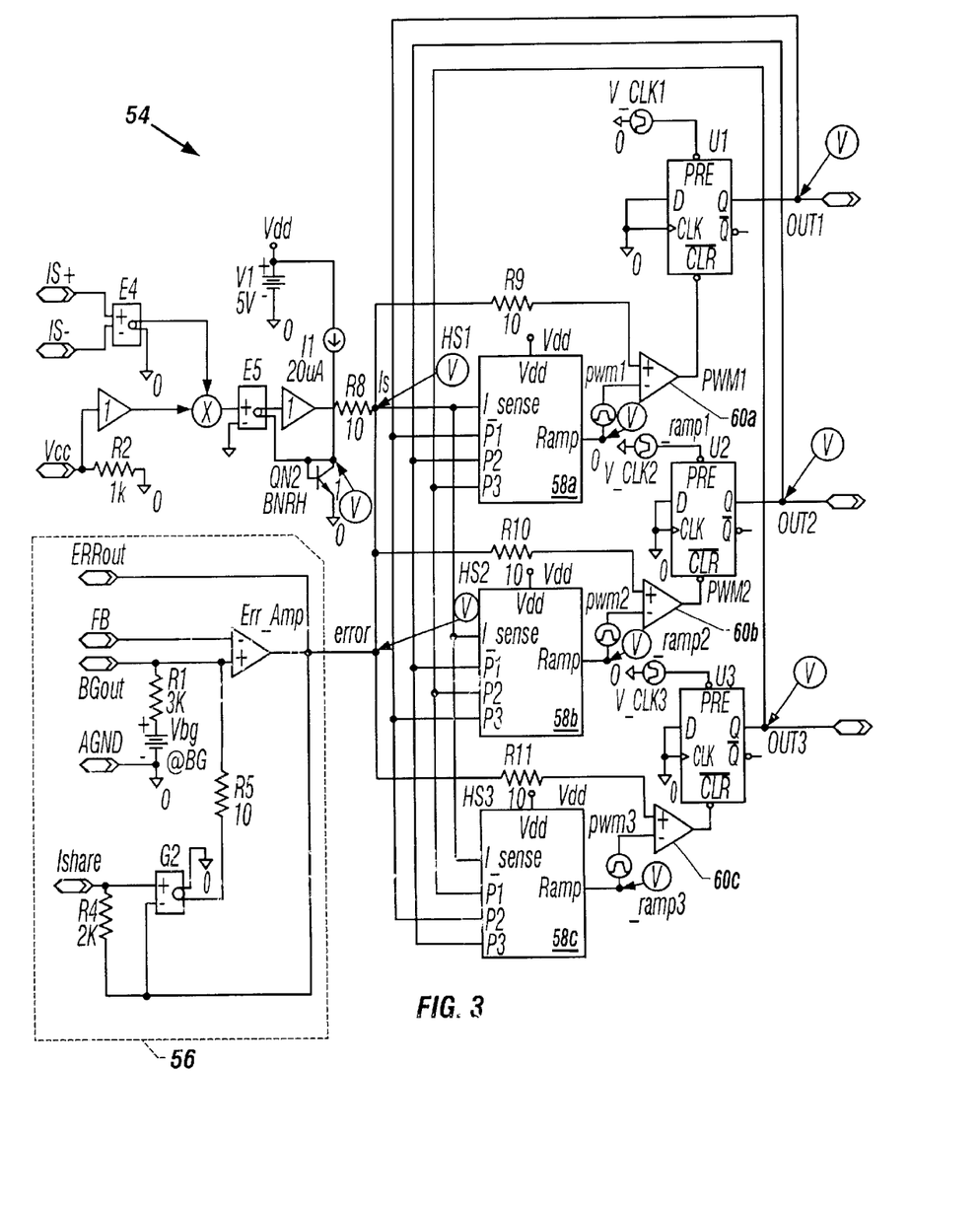
FIG. 3 is an electrical schematic diagram of the charge mode controller in accordance with one embodiment of the present invention.

FIG. 3 is an electrical schematic diagram of the charge mode controller 54 of FIG. 2 is accordance with one embodiment of the present invention. This diagram is also shown as a simulation circuit. A conventional band gap reference plus error amplifier circuit 56 provides an error voltage signal which is used to turn off the various phases when they have achieved a desired phase during a particular cycle of operation. Charge steering circuits 58a, 58b and 58c each have inputs P1, P2 and P3 which correspond to the turn-on logic signal of phases 1, 2 and 3, respectively. They. also receive Vdd (the input voltage signal), I_sense (a signal proportional to the sensed current) and produce a Charge Ramp signal. This charge ramp signal is applied at each phase to a comparator (60a, 60b, 60c) with the error signal and the comparator turns off the phase when the error signal and the Charge Ramp signal are equal. Flip flops U1, U2 and U2 (or equivalent circuitry well known to those of ordinary skill in the art) hold the OUT1, OUT2 and OUT3 signals high until cleared by comparators 60a, 60b and 60c, respectively. Clock signals V_CLK1, V_CLK2 and V_CLK3 turn on flip flops U1, U2 and U3 at the beginning of each respective cycle in a conventional manner.

Figure 4:
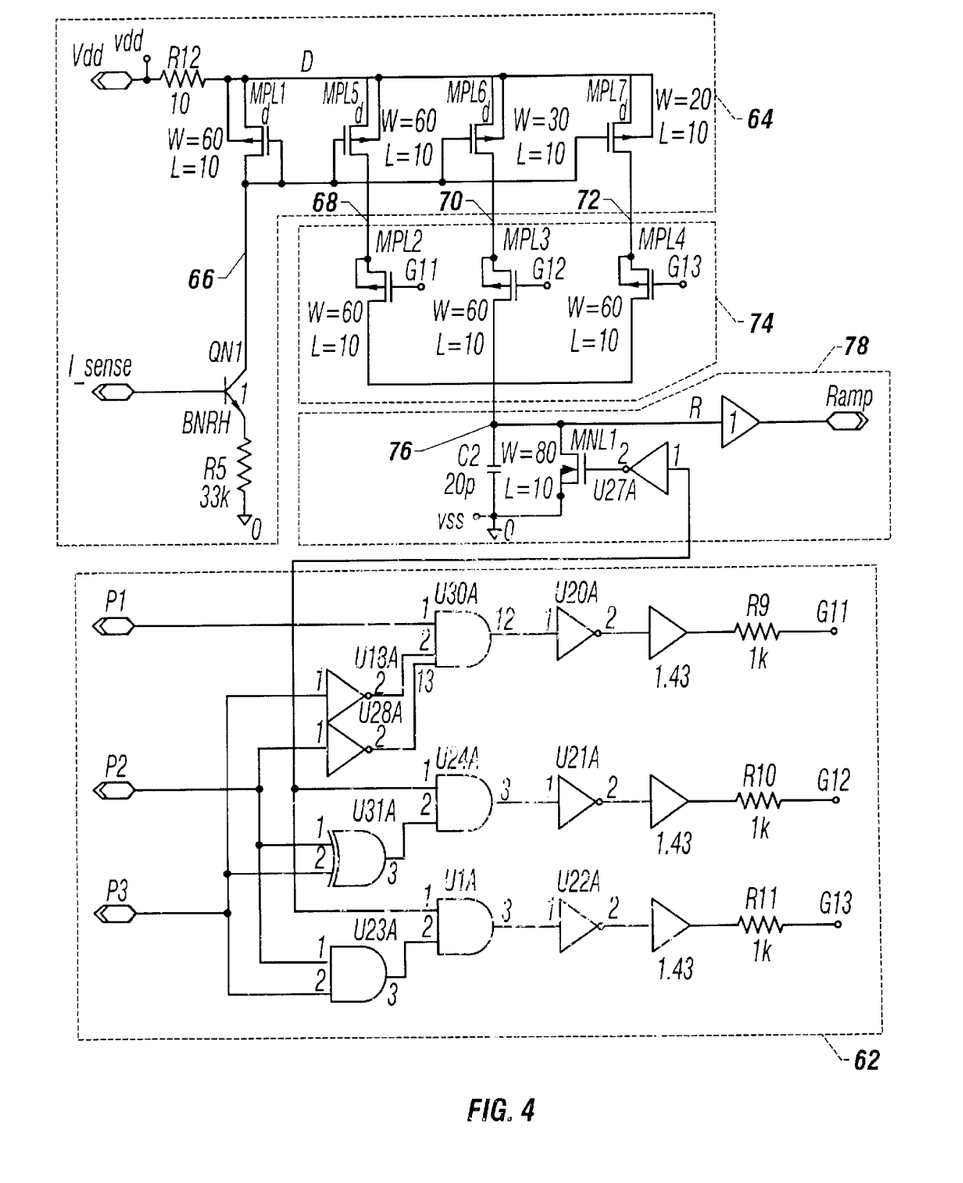
FIG. 4 is an electrical schematic diagram of one instantiation of the charge storing generation block of the charge mode controller of FIG. 3.

FIG. 4 is an electrical schematic diagram (also in simulation form) of one instantiation of the charge steering generation block for phase P1 of the charge-mode controller of FIG. 3. (Note that each of the other phases has a similar, though not identical, block, i.e., substitute P1 for P2, P2 for P3, P3 for P1 for the P2 block, etc.) This circuit includes four main blocks.

The first block is a current level decoder 62 which takes logic inputs P1, P2 and P3, any of which may be "on" or "off" and provides outputs G11, G12 and G13 where G11 is asserted if only one of the three phases P1, P2 and P3 is "on", G12 is asserted if two of the three phases are "on", G13 is asserted if all three phases are "on", and none of G11, G12 and G13 are asserted if all three phases are "off". The logic circuit of decoder 62 is one example of how to perform this function. Many other ways of performing this function are available and more or fewer phases may be implemented as will now be apparent to those of ordinary skill in the art.

The second block is a current mirror block 64 which generates a current I at node 66 which is proportional to I_sense; The same current I is generated at node 68. A current I/2 is generated at node 70 and a current I/3 is generated at node 72. Those of ordinary skill in the art will now realize that there are other techniques for generating these currents and this invention is not intended to be limited to any particular such technique.

The third block is a current selector block 74. Current selector block receives I from node 68, I/2 from node 70 and I/3 from node 72. It gates each of these current sources with the signals G11, G12 and G13, respectively, from current level decoder block 62. Thus, when one phase is in use, G11 is asserted and turns on MOSFET MPL2 allowing current I to pass to node 76, when two phases are in use, G12 is asserted and turns on MOSFET MPL3 allowing I/2 to pass to node 76. Likewise, if all three phases are in use, G13 is asserted, MOSFET MPL4 is turned on and I/3 passes to node 76. In this way, the current passed to node 76 at any moment is scaled with the number of phases in use at that moment.

The fourth block is a Charge Ramp block 78 which provides a charge ramp signal representing an integration via capacitor C2 of the charge received at node 76. When P1 is deasserted by comparator 60a (FIG. 4) switch MNL1 is turned on to discharge C2 until the next cycle. The accumulated voltage on C2 appears at output "Ramp".

To complete the converter, an appropriate filter as well known to those of ordinary skill in the art should also be included as shown, for example, in FIG. 2.

FIGS. 5A–11E illustrate operational characteristics of a power converter built in accordance with the principles shown herein.

Figure 5A:
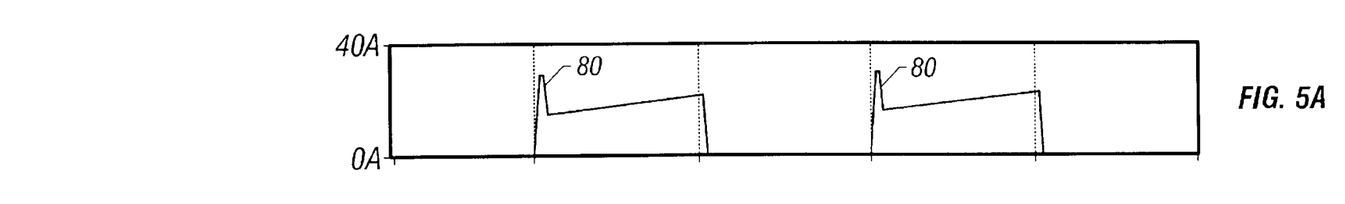
FIG. 5A is a plot of current vs. time for the instantaneous current in the top MOSFET of one phase of a PWM power converter in accordance with the embodiment of FIG. 2.

FIG. 5A is a plot of current vs. time for the instantaneous current in the top MOSFET of one phase of a PWM power converter in accordance with the embodiment of FIG. 2. Note that a leading edge spike 80 is typically present due to MOSFET switching transients. This needs to be filtered out in PICM-type voltage regulators to avoid erroneous operation. In the present approach there is no requirement that it be filtered out.

Figure 5B:
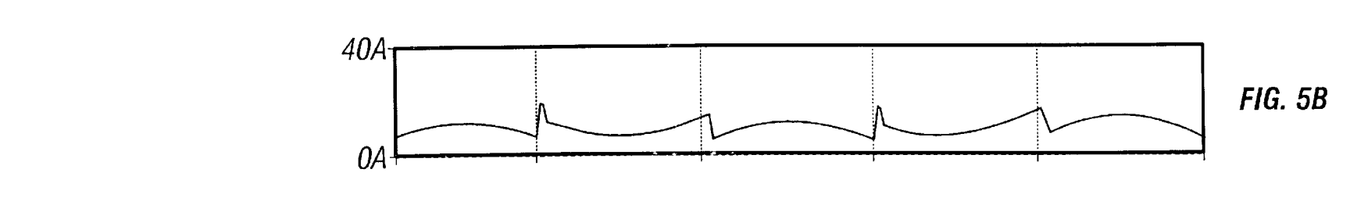
FIG. 5B is a plot of current vs. time for the current in the sensing resistor R12 of FIG. 2.

FIG. 5B is a plot of current vs. time for the current in the sensing resistor R12 of FIG. 2. Due to circuit parasitics, a switching frequency noise is superimposed on the high-side MOSFET current signal which provides a very distorted signal for PICM-type voltage regulation. The present invention avoids this problem.

Figure 5C:
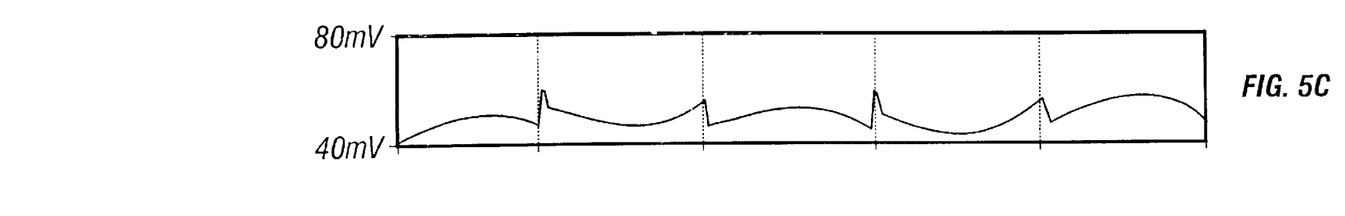
FIG. 5C is a plot of voltage vs. time for the voltage across the current sensing input pins IS+, IS− of FIG. 2.

FIG. 5C is a plot of voltage vs. time for the voltage across the current sensing input pins IS+, IS− of FIG. 2. By applying only common RC filtering, the leading edge spike and the switching noise cannot be effectively removed. This poses a problem for PICM-type operation but not IICM-type operation.

Figure 5D:
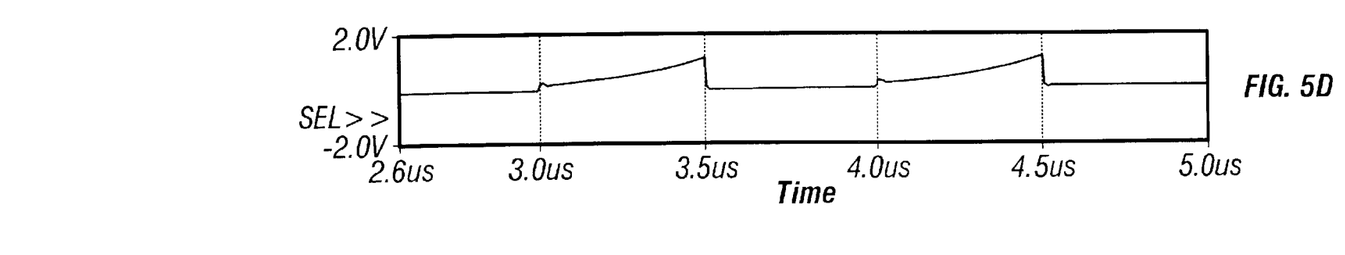
FIG. 5D is a plot of voltage vs. time for the filtered voltage of the Charge Ramp signal used in accordance with the embodiment of FIG. 2 as filtered by C9 and R15.

FIG. 5D is a plot of voltage vs. time for the voltage of the Charge Ramp signal used in accordance with the embodiment of FIG. 2 as filtered by C9 and R15. This Charge Ramp signal is based on charge integration and greatly reduces the noise caused by the leading edge spike and switching. The Charge Ramp signal can therefore be used as a good quality PWM carrier signal. As a result, one can operate the PWM converter at a much higher switching frequency than before, e.g., in excess of 500 KHz.

Figure 6A:
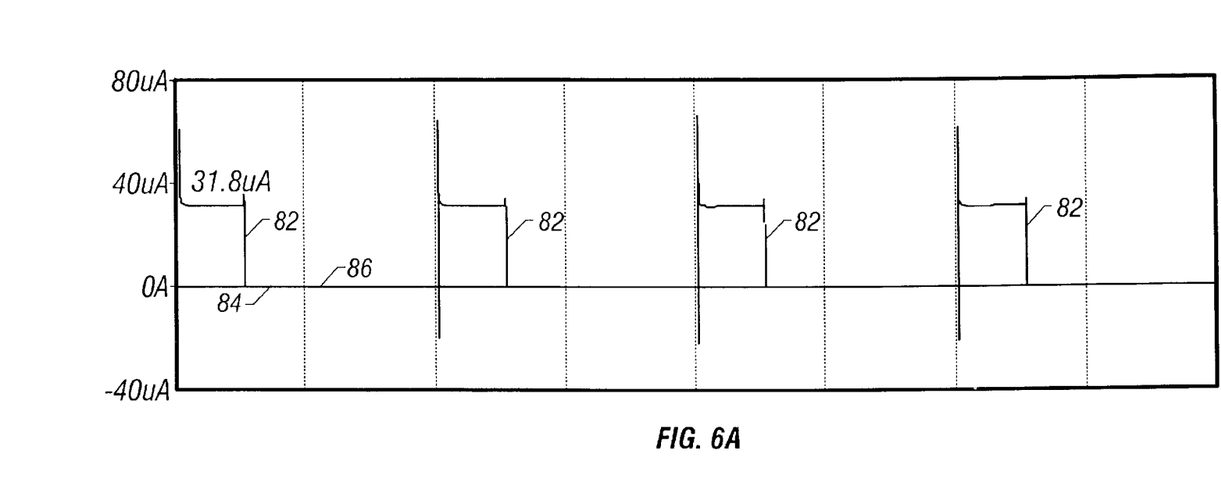
FIG. 6A is a plot of current vs. time for the current passing through MOSFETs MPL2(82), MPL3(84) and MPL4(86) of FIG. 4 for one phase in a no-phase-overlap case. Note that the current through MPL3 and MPL4 is always zero in this case.

FIG. 6A is a plot of current vs. time for the current passing through MOSFETs MPL2(82), MPL3(84) and MPL4(86) of FIG. 4 for one phase in a no-phase-overlap case. Note that the current through MPL3 and MPL4 is always zero in this case.

Figure 6B:
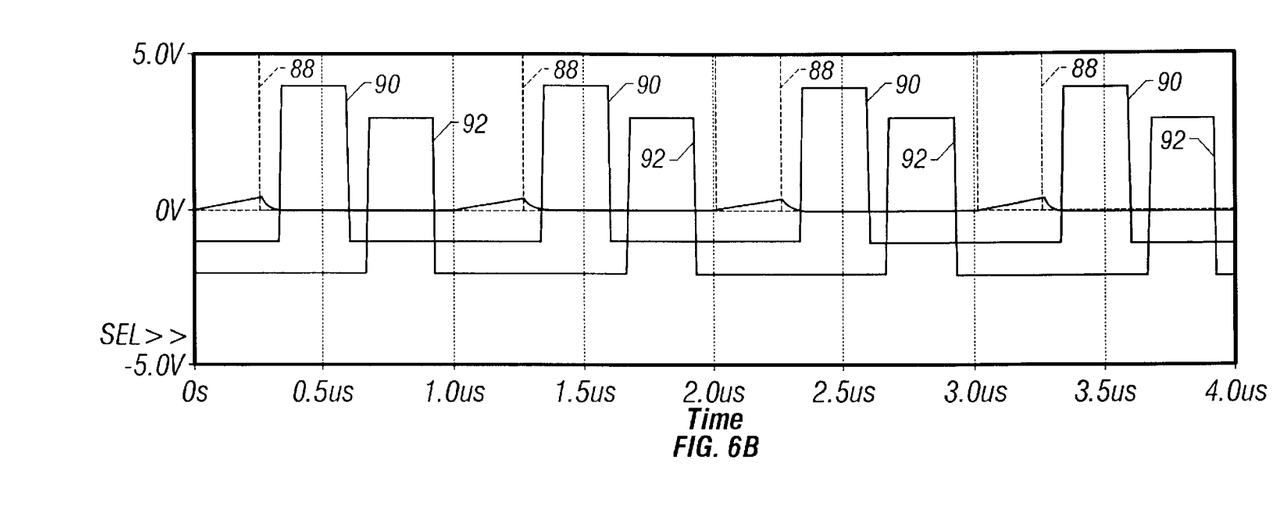
FIG. 6B is a plot of voltage vs. time for the voltages 88, 90, 92, across the drain to source of the low side MOSFETs (or "phase nodes") 138, 140, 142 of the three phases 88, 90, 92.

FIG. 6B is a plot of voltage vs. time for the voltages 88, 90, 92 across the phase nodes 138, 140 and 142 of FIG. 2 for the case of FIG. 6A.

Figure 7A:
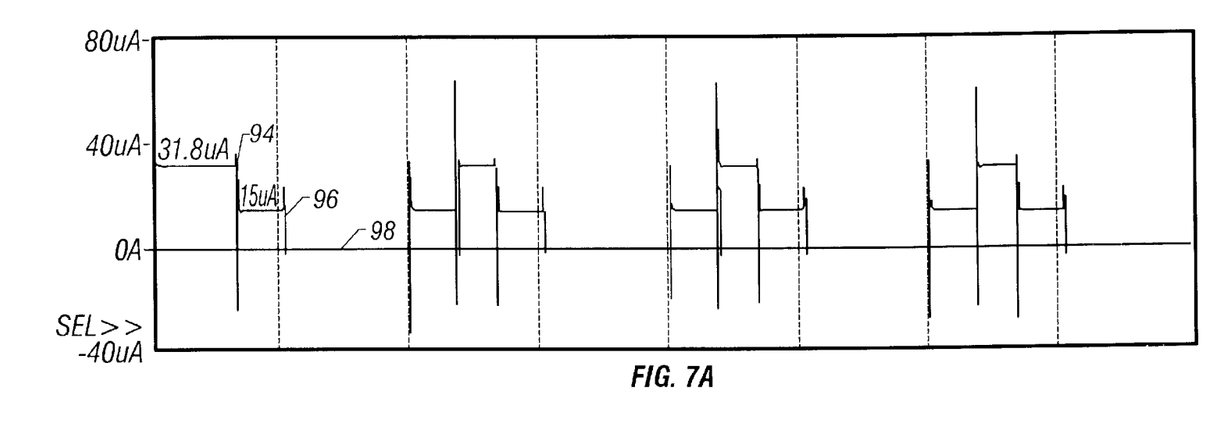
FIG. 7A is a plot of current vs. time for the current passing through MOSFETs MPL2(94), MPL3(96) and MPL4(98) of FIG. 4 for a two-phase-overlap case. Note that the current through MPL4 is always zero in this case.

FIG. 7A is a plot of current vs. time for the current passing through MOSFETs MPL2(94), MPL3(96) and MPL4(98) of FIG. 4 for a two-phase-overlap case. Note current through MPL4 is always zero in this case.

Figure 7B:
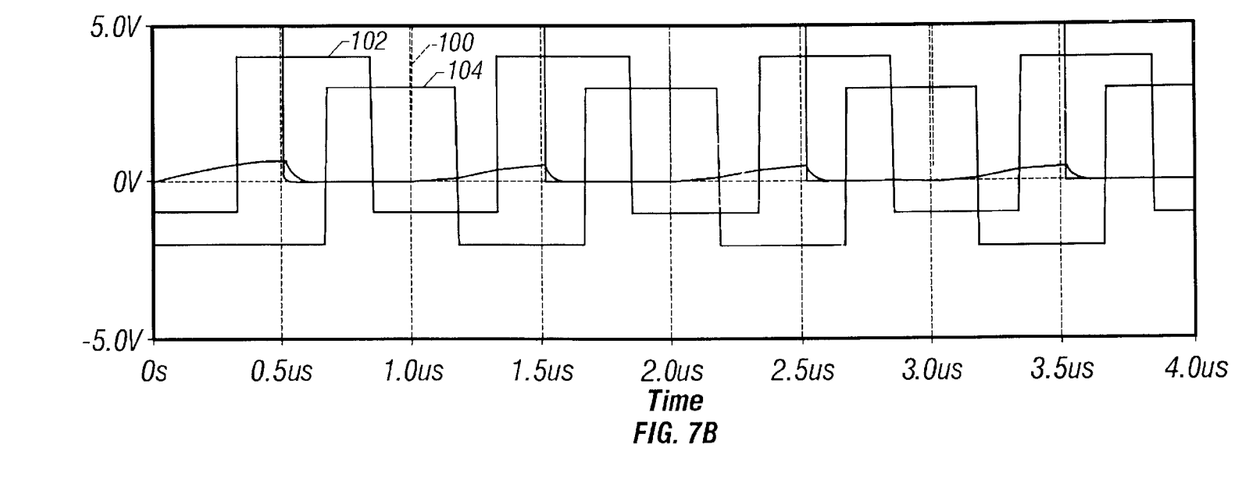
FIG. 7B is a plot of voltage vs. time for the voltage across the phase nodes 138, 140, 142 of the three phases 100, 102, 104.

FIG. 7B is a plot of voltage vs. time for the voltage across the phase nodes 138, 140 and 142 of FIG. 2 for the case of FIG. 7A.

Figure 8A:
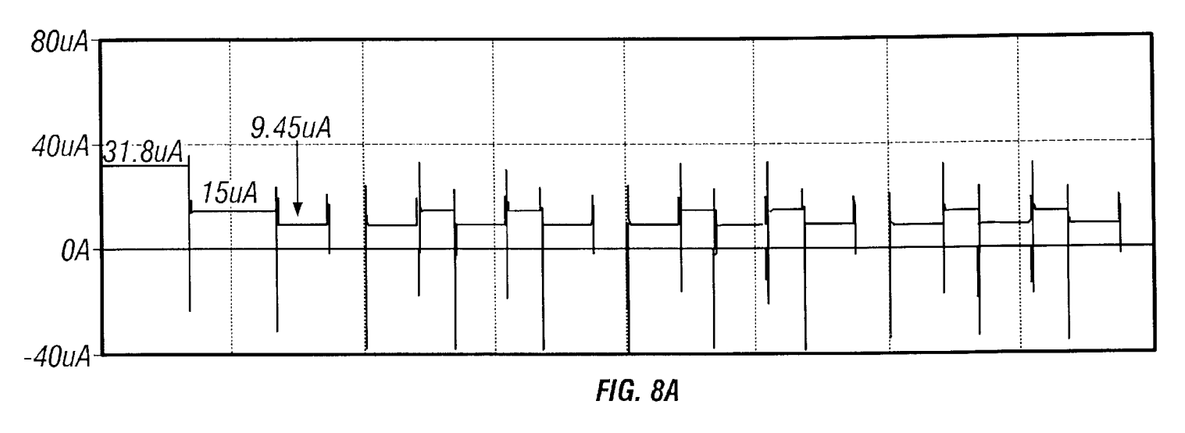
FIG. 8A is a plot of current vs. time for the current passing through MOSFETs MPL2(106), MPL3(108) and MPL4 (110) of FIG. 4 in a three-phase overlap case.

FIG. 8A is a plot of current vs. time for the current passing through MOSFETs MPL29(106), MPL3(108) and MPL4(10) of FIG. 4 in a three-phase overlap case.

Figure 8B:
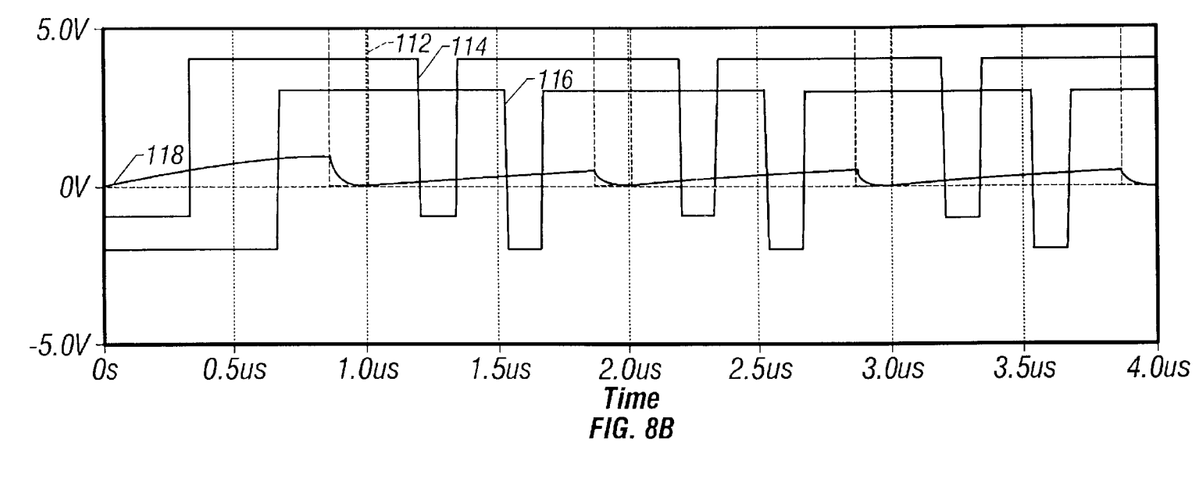
FIG. 8B is a plot of voltage vs. time for the voltage across the phase nodes 138, 140, 142 of the three phases 112, 114 and 116 and also illustrating the Charge Ramp signal for phase 1 (118).

FIG. 8B is a plot of voltage vs. time for the voltage across the phase nodes 138, 140 and 142 of FIG. 2 for the case of FIG. 8A.

Figure 9A:
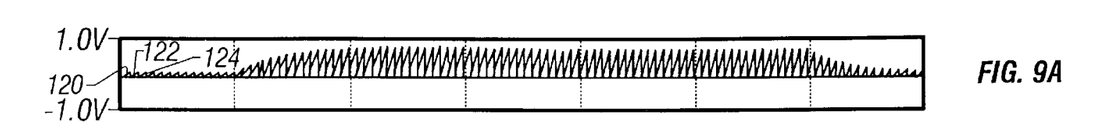
FIG. 9A is a plot of voltage vs. time for the three Charge Ramp signals 120, 122, 124 which are the outputs of the integrators.

FIG. 9A is a plot of voltage vs. time for the Charge Ramp signals which are outputs of the integrators.

Figure 9B:
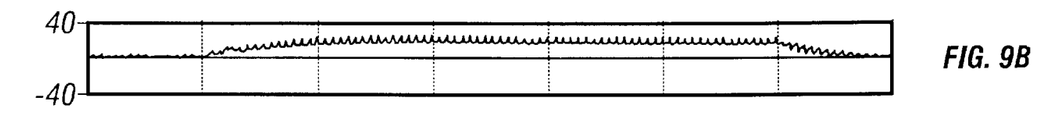
FIG. 9B is a plot of current vs. time for the current flow through the input sensing resistor R12.

FIG. 9B is a plot of current vs. time for the current through sensing resistor R12.

Figure 9C:
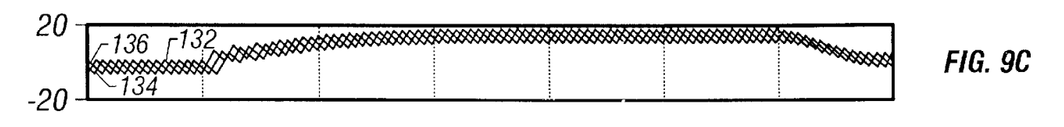
FIG. 9C is a plot of current vs. time for the output inductor currents taken at nodes 126, 128 and 130 of FIG. 2. The corresponding traces are 132, 134 and 136.

FIG. 9C is a plot of current vs. time for the output inductor currents taken at nodes 126, 128 and 130 of FIG. 2. The corresponding traces are 132, 134 and 136.

Figure 9D:
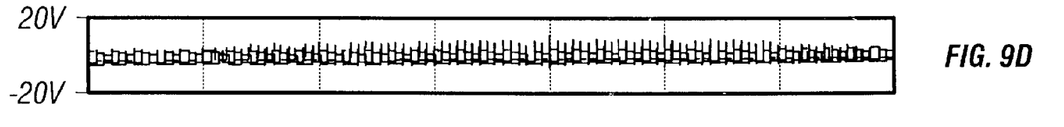
FIG. 9D is a plot of voltage vs. time for the three phase nodes 138, 140, 142 of FIG. 2.

FIG. 9D is a plot of voltage vs. time for the phase nodes 138, 140 and 142 of FIG. 2.

Figure 9E:
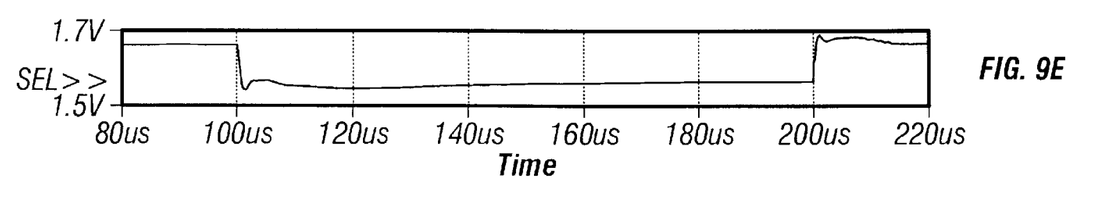
FIG. 9E is a plot of voltage vs. time for the overall voltage output of the power converter. Note that the converter transitions from no load at 80 μS–100 μS to full load at 100 μS–200 μS and back to no load at 200 μS–220 μS.

FIG. 9E is a plot of voltage vs. time for the overall voltage output of the power converter. Note that the converter transitions from no load at 80 $\mu$S–100 $\mu$S to full load at 100 $\mu$S–200 $\mu$S and-back to no load at 200 $\mu$S–220 $\mu$S.

Figure 10A:
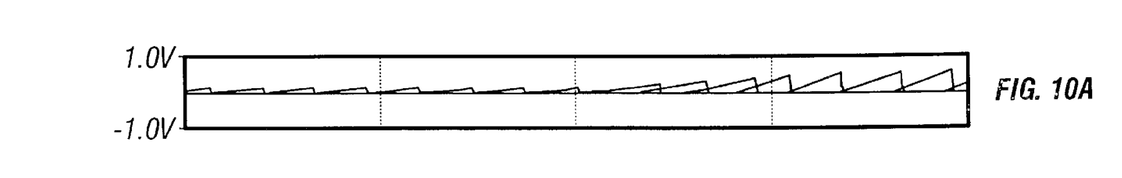
FIG. 10A is a plot of voltage vs. time showing 20 μS of the plot of FIG. 9A surrounding application of a maximum load at T=100 μS.

FIG. 10A is a plot of voltage vs. time showing 20 $\mu$S of the plot of FIG. 9A surrounding application of a maximum load at T=100 $\mu$S.

Figure 10B:
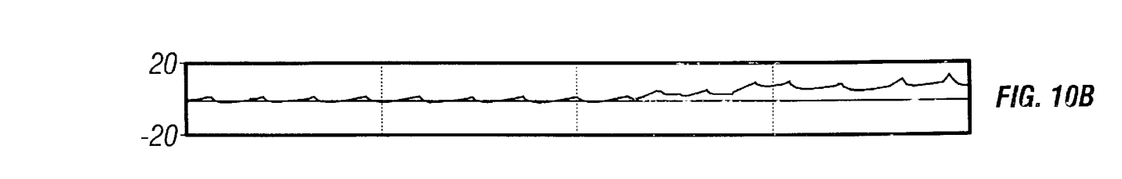
FIG. 10B is a plot of current vs. time showing 20 μS of the plot on FIG. 9B surrounding application of a maximum load at T=100 μ.

FIG. 10B is a plot of current vs. time showing 20 $\mu$S of the plot on FIG. 9B surrounding application of a maximum load at T=100 $\mu$S.

Figure 10C:
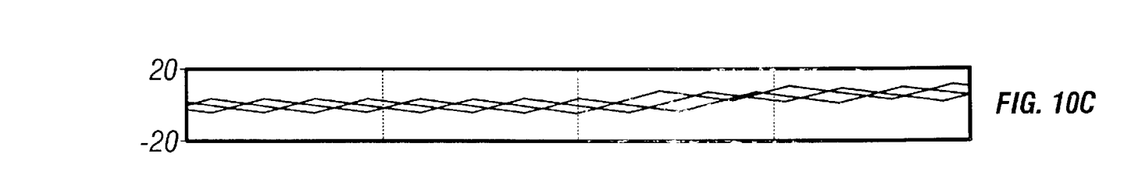
FIG. 10C is a plot of current vs. time showing 20 μS of the plot of FIG. 9C surrounding application of a maximum load at T=100 μS.

FIG. 10C is a plot of current vs. time showing 20 $\mu$S of the plot of FIG. 9C surrounding application of a maximum load at T=100 $\mu$S.

Figure 10D:
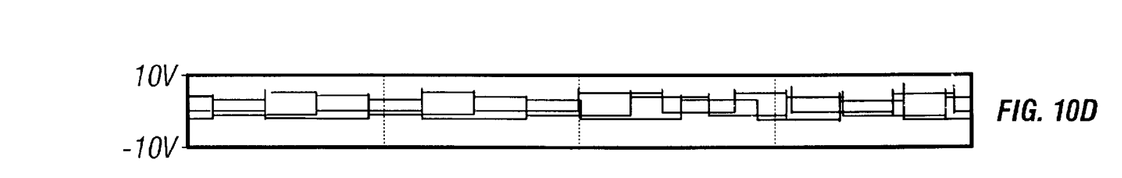
FIG. 10D is a plot of voltage vs. time showing 20 v of the plot of FIG. 9D surrounding application of a maximum load at T=100 μS.

FIG. 10D is a plot of voltage vs. time showing 20 v of the plot of FIG. 9D surrounding application of a maximum load at T=100 $\mu$S.

Figure 10E:
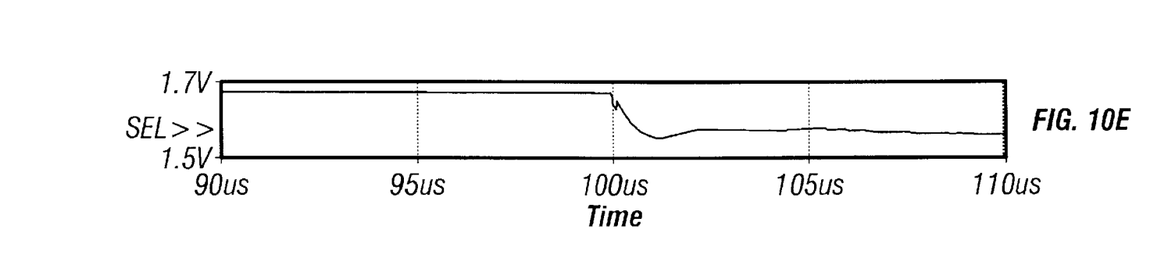
FIG. 10E is a plot of voltage vs. time showing 20 μS of the plot of FIG. 9E surrounding application of a maximum load at T=100 μS.

FIG. 10E is a plot of voltage vs. time showing 20 $\mu$S of the plot of FIG. 9E surrounding application of a maximum load at T=100 $\mu$S.

Figure 11A:
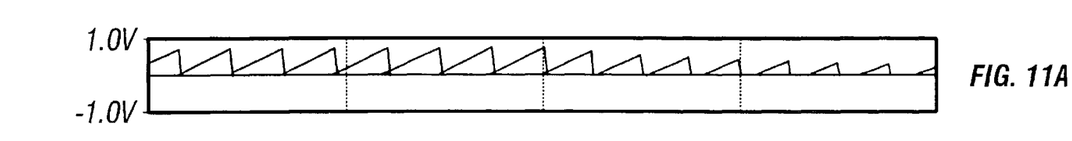
FIG. 11A is a plot of voltage vs. time showing 20 μS of the plot of FIG. 9A surrounding release of the maximum load at T=200 μS.

FIG. 11A is a plot of voltage vs. time showing 20 $\mu$S of the plot of FIG. 9A surrounding release of the maximum load at T=200 $\mu$S.

Figure 11B:
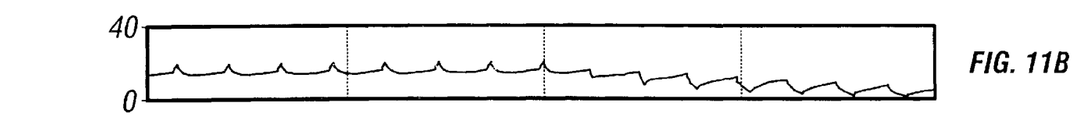
FIG. 11B is a plot of current vs. time showing 20 μS of the plot of FIG. 9B surrounding release of the maximum load at T=200 μS.

FIG. 11B is a plot of current vs. time showing 20 $\mu$S of the plot of FIG. 9B surrounding release of the maximum load at T=200 $\mu$S.

Figure 11C:
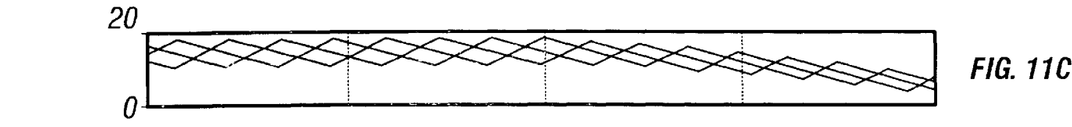
FIG. 11C is a lot of current vs. time showing 20 μS of the plot of FIG. 9C surrounding release of the maximum load at T=200 μS.

FIG. 11C is a lot of current vs. time showing 20 $\mu$S of the plot of FIG. 9C surrounding release of the maximum load at T=200 $\mu$S.

Figure 11D:
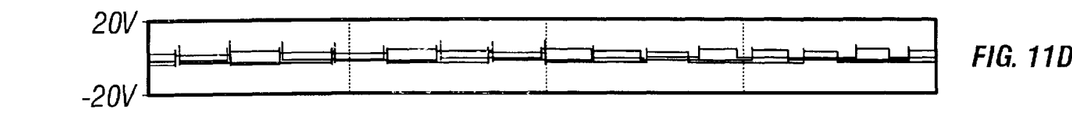
FIG. 11D is a plot of voltage vs. time showing 20 μS of the plot of FI9D surrounding release of the maximum load at T=200 μS.

FIG. 11D is a plot of voltage vs. time showing 20 $\mu$S of the plot of FIG. 9D surrounding release of the maximum load at T=200 $\mu$S.

Figure 11E:
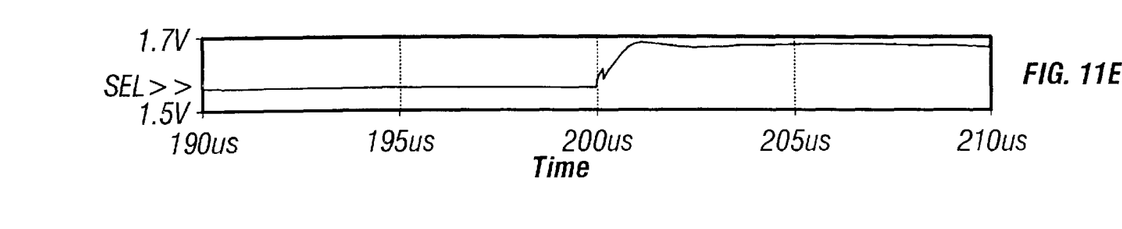
FIG. 11E is a plot of voltage vs. time showing 20 μS of the plot of FIG. 9E surrounding release of the maximum load at T=200 μS.

FIG. 11E is a plot of voltage vs. time showing 20 μS of the plot of FIG. 9E surrounding release of the maximum load at T=200 μS.

The present invention is not limited to use in buck converter circuits and will find use in many types of power converter circuits. While the present invention is primarily intended for use in multi-phase converters, it will operate in a single phase environment, a two-phase environment, etc., as desired by the circuit designer.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. An N-phase controller for a switched-mode power converter, N being an integer of 1 or greater, said controller comprising associated with a first phase:
    a current mirror circuit providing N separate current signals proportional to a total current I used by the converter, said N signals respectively comprising a current proportional to I/n for n=1 to N;
    a current level decoder coupled to a source of an ON/OFF control signal for each of said N phases, said current level decoder providing a signal indicating a number, K, of phases currently ON;
    a current selector coupled to said current level decoder and to said current mirror circuit, said current selector having an output proportional to I/K; and
    a charge ramp circuit coupled to said current selector and integrating a signal from said output of said current selector while said first phase is ON.

2. An apparatus in accordance with claim 1, wherein said charge ramp circuit comprises a capacitor.

3. A multi-phase controller for a switched-mode power converter, said controller including circuitry associated with each phase comprising:
    a current mirror circuit providing N (where N is the number of phases in the converter) separate current signals proportional to a total current I used by the converter, said N signals respectively comprising a current proportional to I/n for n=1 to N;
    a current level decoder coupled to a source of an ON/OFF control signal for each of said N phases, said current level decoder providing a signal indicating a number, K, of phases currently ON;
    a current selector coupled to said current level decoder and to said current mirror circuit, said current selector having an output proportional to I/K; and
    a charge ramp circuit coupled to said current selector and integrating a signal from said output of said current selector while the phase in ON.

4. An apparatus in accordance with claim 2, wherein said charge ramp circuit comprises a capacitor.

5. A method for controlling an N-phase switched-mode power converter, said method comprising:
    monitoring a total current I used by the converter;
    generating N separate current signals proportional to I, said N current signals respectively comprising a current proportional to I/n for n=1 to N;
    detecting a number, K, of phases turned ON;
    selecting one of said N current signals based on K;
    integrating said selected signal to form a Charge Ramp signal;
    comparing said integrated Charge Ramp signal with an error signal; and
    turning off a phase when its corresponding Charge Ramp signal is not less than said error signal.

6. A method in accordance with claim 5, wherein said monitoring is accomplished with a resistor.

7. A method in accordance with claim 6, wherein said resistor has a resistance of less than or equal to 0.005 ohms.

8. A method in accordance with claim 5, wherein said generating is accomplished with a current mirror circuit.

9. A method in accordance with claim 5, wherein said integrating is accomplished with a capacitor.

10. A method in accordance with claim 5, wherein said comparing is accomplished with a comparator.

11. A method in accordance with claim 9, further comprising:
    shorting said capacitor when said phase is turned off.

12. A method for controlling an N-phase switched-mode power converter, said method comprising:
    monitoring a total current, I, used by all phases of the converter;
    generating in controller circuitry associated with each phase of the converter N separate current signals proportional to I, said N signals respectively comprising a current proportional to I/n for n=1 to N;
    detecting a number, K, of phases of the converter turned ON;
    selecting in controller circuitry associated with each phase of the converter one of said N current signals based on K;
    integrating in controller circuitry associated with each phase of the converter said selected signal to form a charge ramp signal;
    comparing in controller circuitry associated with each phase of the converter said Charge Ramp signal with an error signal; and
    turning off a phase when its corresponding Charge Ramp signal is not less than said error signal.

13. A method in accordance with claim 12, wherein said monitoring is accomplished with a resistor.

14. A method in accordance with claim 13, wherein said resistor has a resistance of less than or equal to 0.005 ohms.

15. A method in accordance with claim 12, wherein said generating is accomplished with a current mirror circuit.

16. A method in accordance with claim 12, wherein said integrating is accomplished with a capacitor.

17. A method in accordance with claim 12, wherein said comparing is accomplished with a comparator.

18. A method in accordance with claim 16, further comprising:
    shorting said capacitor when said phase is turned off.

19. An apparatus for controlling an N-phase switched-mode power converter, said apparatus comprising:
    means for monitoring a total current I used by the converter;
    means for generating N separate current signals proportional to I, said N current signals respectively comprising a current proportional to I/n for n=1 to N;
    means for detecting a number, K, of phases turned ON;
    means for selecting one of said N current signals based on K;
    means for integrating said selected signal to form a Charge Ramp signal;
    means for comparing said integrated Charge Ramp signal with an error signal; and means for turning off a phase when its corresponding Charge Ramp signal is not less than said error signal.

20. An apparatus in accordance with claim 19, wherein said means for monitoring includes a resistor.

21. An apparatus in accordance with claim 20, wherein said resistor has a resistance of less than or equal to 0.005 ohms.

22. An apparatus in accordance with claim 19, wherein said means for generating includes a current mirror.

23. An apparatus in accordance with claim 19, wherein said means for integrating includes a capacitor.

24. An apparatus in accordance with claim 19, wherein said means for comparing includes a comparator.

25. An apparatus in accordance with claim 23, further comprising means for shorting said capacitor when said phase is turned off.

26. An apparatus for controlling an N-phase switched-mode power converter, said method comprising:

means for monitoring a total current, I, used by all phases of the converter;

means for generating in controller circuitry associated with each phase of the converter N separate current signals proportional to I, said N signals respectively comprising a current proportional to I/n for n=1 to N;

means for detecting a number, K, of phases of the converter turned ON, means for selecting in controller circuitry associated with each phase of the converter one of said N current signals based on K;

means for integrating in controller circuitry associated with each phase of the converter said selected signal to form a charge ramp signal;

means for comparing in controller circuitry associated with each phase of the converter said Charge Ramp signal with an error signal; and means for turning off a phase when its corresponding Charge Ramp signal is not less than said error signal.

27. An apparatus in accordance with claim 26, wherein said means for monitoring includes a resistor.

28. An apparatus in accordance with claim 27, wherein said resistor has a resistance of less than or equal to 0.005 ohms.

29. An apparatus in accordance with claim 26, wherein said means for generating includes a current mirror.

30. An apparatus in accordance with claim 26, wherein said means for integrating includes a capacitor.

31. An apparatus in accordance with claim 26, wherein said means for comparing includes a comparator.

32. An apparatus in accordance with claim 30, further comprising means for shorting said capacitor when said phase is turned off.

* * * * *

UNITED STATES PATENT AND TRADEMARK OFFICE
CERTIFICATE OF CORRECTION

PATENT NO.   : 6,462,521 B1
DATED        : October 8, 2002
INVENTOR(S)  : Eric X. Yang and Trevor M. Newlin It is certified that error appears in the above-identified patent and that said Letters Patent is hereby corrected as shown below:

<u>Column 1,</u>
Line 8, replace "modem" with -- modern --.

Signed and Sealed this

Fourth Day of March, 2003

JAMES E. ROGAN
*Director of the United States Patent and Trademark Office*